3,409,342
METHOD OF HEAT SEALING FLASH-
LAMPS CONTAINING COMBUSTIBLE
GAS MIXTURES
Robert M. Anderson, Pepper Pike, and Louis A. Demchock, Jr., Lyndhurst, Ohio, assignors to General Electric Company, a corporation of New York
Filed Dec. 23, 1966, Ser. No. 604,282
6 Claims. (Cl. 316—24)

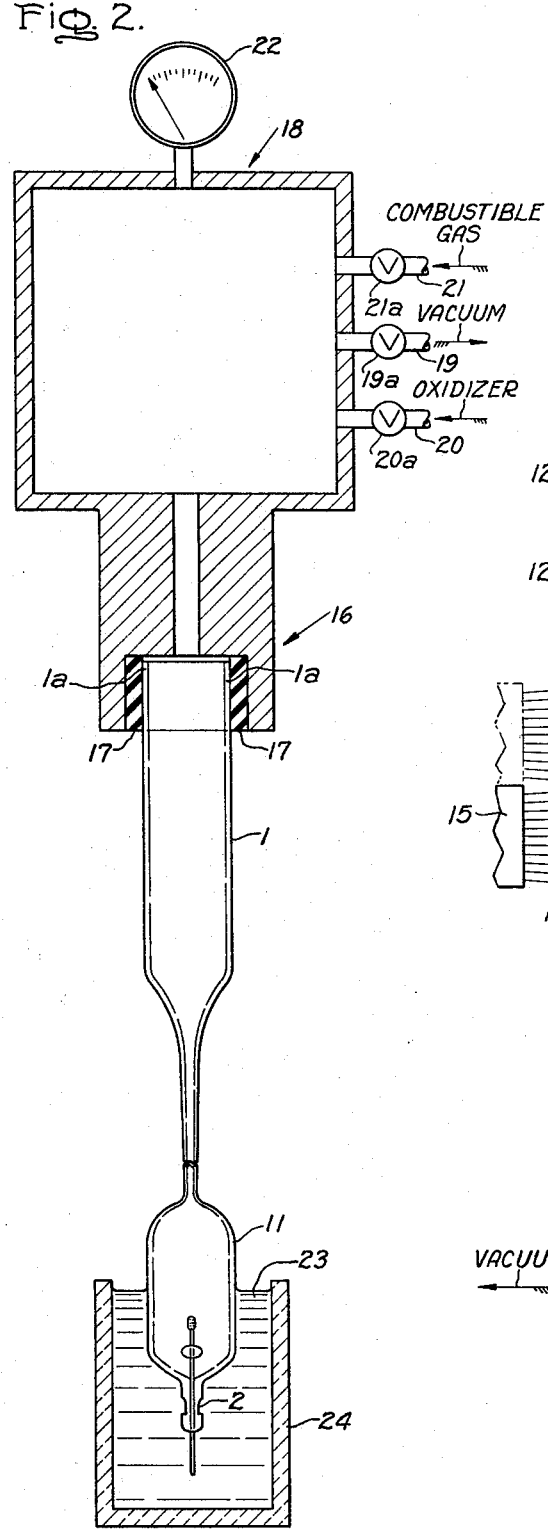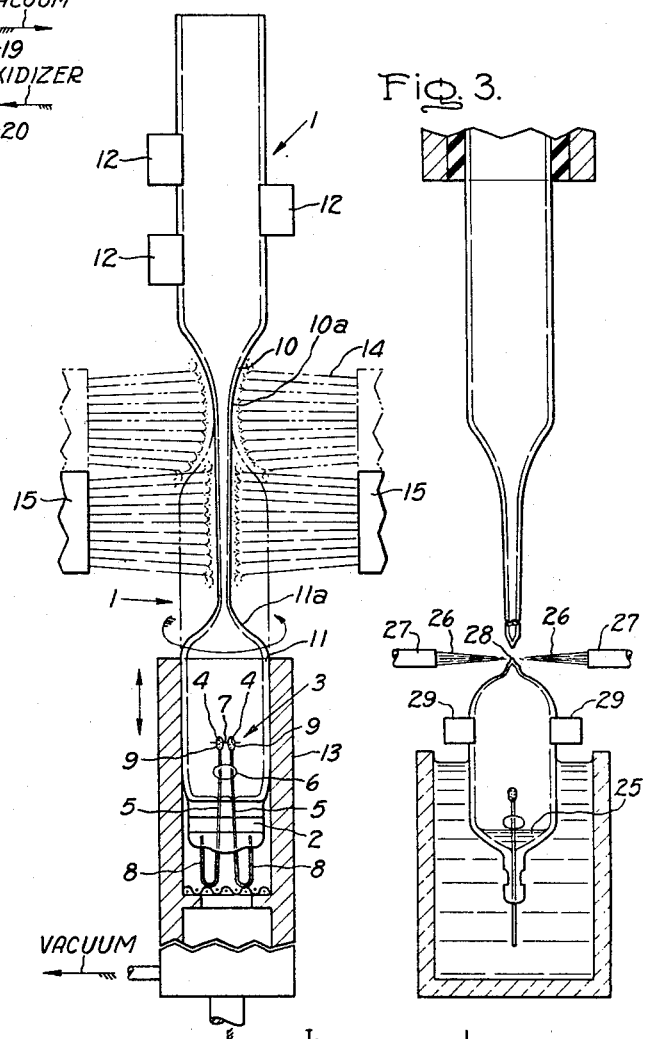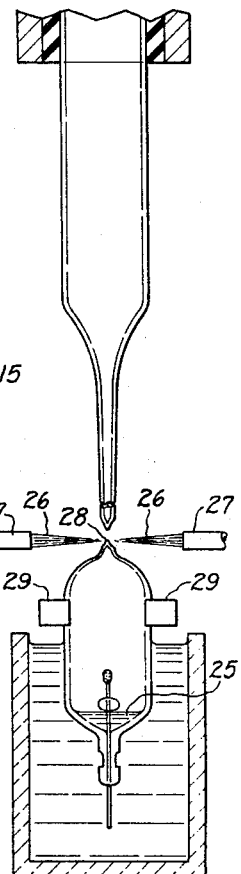
Inventors:
Robert M. Anderson
Louis A. Demchock, Jr.
by Richard H. Burgess
Their Attorney United States Patent Office 3,409,342
Patented Nov. 5, 1968

ABSTRACT OF THE DISCLOSURE

A flashlamp of the type having a hermetically sealed vitreous bulb and containing a filling of combustible gas is manufactured by the following process: (1) a vitreous tube having an ignition mount structure sealed in one end is heated at an intermediate section and attenuated resulting in a bulb being formed at one end; (2) the tube is evacuated and filled with a combustible gas mixture; (3) the sealed end including a portion of the bulb is immersed in a coolant so that a sufficient portion of the combustible mixture is condensed to render the remaining gaseous mixture no longer explosive; (4) the attenuated portion is heated until the walls collapse and the bulb is hermetically sealed. Alternatively, the bulb may contain a filling of filamentary material in addition to the gaseous mixture.

Background of the invention (1) *Field of the invention.*—This invention relates, in general, to a method of manufacture of flashlamps of the type comprising a hermetically sealed radiation-transmitting envelope or bulb containing a combustible gas mixture which on ignition produces a momentary flash of actinic light of high intensity. More particularly, this invention relates to a method of manufacture of flashlamps whereby a radiation-transmitting envelope is heat sealed at an opening while containing a mixture of partially condensed gases which will be combustible when the flashlamp is at room temperature, such as a mixture of a hydro-carbon gas and oxygen.

(2) *Descriptilon of prior art.*—Most of the present day commercial flashlamps use as a combustible material aluminum or zirconium alloy filamentary material. While these flashlamps have good radiating efficiency, flashlamps have been developed which contain only a gas filling to satisfy certain photographic needs for a sharply-peaked short time duration flash. For example, Patent No. 2,013,371, Van Liempt et al. discloses a flashlamp which provides actinic light entirely by the reaction of a gas mixture. As pointed out by Van Liempt, one of the difficulties to be surmounted in manufacturing lamps filled with combustible gas mixtures is to prevent explosion when the vitreous envelope is hermetically sealed, which requires heating part of it to a suitable viscous state, usually by means of an open flame or by electric heaters.

Van Liempt et al. suggests several methods of manufacturing such lamps as follows:

(1) An exhaust tube is provided which after filling is sealed with a plastic sealing wax to form an air-tight seal.

(2) The exhaust tube and a gas supply tube are connected by rubber tubing. The two tubes are separated and the rubber tube is pinched off in the intermediate portion between the glass tubes, cut above the pinched-off portion, and sealing wax is used to seal the rubber tube.

(3) The glass exhaust tube is filled with a porous material so that the propagation of an explosion from exhaust tube to the bulb is prevented. The tube is then heated and sealed.

Clearly from this example of prior art, expensive and inefficient methods have been employed in sealing flashlamps containing explosive gas mixtures. An object of this invention is to provide a simple method of making flashlamps containing combustible gases in which they are sealed off by heating the envelope to form a hermetic seal.

Another object of this invention is to provide a method of making flashlamps containing combustible gases which is adaptable to modern high speed flashlamp producing machinery.

Summary of the invention

Briefly stated, the present invention provides the method of manufacture of flashlamps having a radiation-transmitting vitreous bulb which has been filled through an attenuation located between the bulb and an opening with a mixture of oxidizing and reducing gases which will rapidly combust on ignition and which is susceptible to ignition by temperatures used to seal the bulb, comprising the steps of:

(a)) Cooling the bulb with a refrigerant having a lower boiling point than at least one of the oxidizing or reducing gases for a period of time to condense a sufficient portion of at least one of such gases to render the remaining gaseous mixture no longer combustible at the temperatures used to seal the bulb, (b) Sealing the bulb by heating the attenuation to a viscous state and causing the attenuation to close, whereby the bulb is hermetically sealed.

The words oxidizing and reducing herein have their usual chemical meanings. Actual reaction with oxygen is not necessary for an oxidation-reduction reaction to occur. An oxidizing gas is one which causes an increase in valence of the elements it reacts with. A reducing gas causes a reduction in valence.

Present commercially produced lamps are made of a glass which becomes sufficiently viscous for sealing at a temperature 600–700° C.

Further features and advantages of the invention will appear from the following detailed description to be read in conjunction with the accompanying drawing, and the scope of the invention will be pointed out in the appended claims.

Brief description of the drawing

FIGS. 1–3 illustrate successive steps involved in the manufacture of a flash lamp according to the invention; the illustrated steps are as follows:

FIG. 1 is a side elevation of a vitreous tube with a lamp mount sealed in one end which illustrates drawing the attenuation in the tube intermediate its ends to form the bulb used for the finished lamp.

FIG. 2 is an elevation showing the exhausting of the lamp bulb and the introduction of a combustible gas thereinto.

FIG. 3 is an elevation showing the tipping-off of the finished lamp bulb from the glass tube.

Description of the preferred embodiments

For the purpose of convenience, and not by way of limitation, the invention will be described with particular reference to combustible gas filled flashlamps deriving their actinic light from a gas reaction and having an envelope or bulb construction of an AG–1 photoflash lamp. AG–1 lamps and methods for their production are described in Patent No. 3,188,162, Anderson et al., assigned to the assignee of the present invention.

Referring to FIG. 1 of the drawing, a vitreous lamp tube 1 having a compressed portion or pinch seal 2 is provided with a conventional lamp mount or mount structure 3. Lamp mount 3 conventionally provides ignition means 4 and comprises lead-in wires 5 which are rigidly held together in closely spaced side by side relation by bead 6 of suitable insulating material such as glass. Connected across the inner ends of the lead-in wires 5 is an ignition filament 7 preferably of tungsten-rhenium alloy wire, described and claimed in Patent # 3,123,993, Cressman et al., assigned to the assignee of the present invention. The outer ends of the lead-in wires 5 are retroverted and embedded in the pinch seal 2 to thereby form double leg open loop-shaped end portion 8 adapted to serve as the terminal contacts of the finished lamp. A quantity of primer or fulminating material 9 has been applied through the open end of the vitreous tube 1, before it was attenuated, onto portions of the lead-in wires 5 at the filament. Primer material 9 may be of any suitable composition such as conventionally employed in flashlamps, preferably metal powders such as zirconium or manganese in a powdered oxidizing agent such as potassium perchlorate bonded together by suitable binders. Further discussion of suitable primer materials is found in Patent # 2,756,577, Anderson, assigned to the assignee of the present invention. After mount structure 3 is sealed into one end of the lamp tube 1, and before attenuation, combustible metallic filamentary materials could be inserted through the open end, if desired, by methods known in the art.

After the lamp mount structure 3 has been assembled and one end of the lamp tube 1 is sealed, the lamp tube 1 is then ready for the next operation in which the lamp tube 1 is constricted or attenuated intermediate its open end and the bulb. FIG. 1 shows attenuated portion 10. In this operation the portion of the glass tube between pinch seal 2 and attenuated portion 10 is formed into bulb 11 for the finished flash lamp. The constricting of the lamp tube 1 intermediate its ends may be accomplished with the tube 1 supported in a vertical position with its pinch seal 2 down and held by upper and lower holders 12 and 13, respectively, which are capable of rotating the lamp tube about its longitudinal axis. Heating and softening the intermediate region of the tube between the two holders 12 and 13 is accomplished by directing gas fires 14 thereagainst from gas burners 15. As shown in FIG. 1, the upper holder 12 may consist of opposed pairs of jaws while the lower holder 13 may consist of a vacuum chuck which is connected to a source of vacuum. When the intermediate section of the lamp tube 1, which is to be constricted, has become heated and softened to a proper degree, and partially collapsed as indicated at 10a in FIG. 1, the lower chuck 13 is moved downwardly to pull the sealed end of the lamp tube held therein downwardly, thereby drawing and attenuating the heated and softened intermediate section of the glass tube into a thin constriction or attenuated portion 10 and forming the lower end portion of the lamp tube into a bulb 11 for the finished lamp. The constricted section 10 serves as an exhaust tubulation on the bulb 11 for subsequently exhausting of the bulb and introduction of a gas filling. As shown in FIG. 1, the burners 15 are moved down along with the lower chuck 13 during the tube attenuation operation in order to maintain the portion of the lamp tube immediately adjacent to the dome 11a of the bulb 11 sufficiently plastic to cause it to be drawn into a thin and substantially straight-sided tube extending from the dome 11a.

After constricting the intermediate section of the lamp tube 1, the lamp tube 1 is ready for the next operation in which the tube is evacuated and filled with a suitable gas filling as shown in FIG. 2.

The exhausting and gas filling of the lamp tube 1 may be performed in the manner customary in the lamp making art. The upper or open end 1a of tube 1 is inserted into exhaust head 16 of a lamp exhausting and gas filling machine. Suitable types of such machines are known in the art. The exhaust head 16 has a washer-like compression rubber fitting 17 seated therein to provide an airtight connection with the exterior of the tube's upper end 1a.

The exhaust head 16 is connected through chamber 18 to a vacuum line 19, an oxidizer line 20 and a combustible gas line 21. These lines may be connected to the chamber alternately by control valves 19a, 20a and 21a, respectively. Chamber 18 also has a pressure gage 22 mounted to monitor the gas pressure and vacuum in the chamber, which becomes the pressure in bulb 11 at equilibrium. The minimum practical chamber size is desirable to minimize waste gas and increase the speed of lamp manufacture.

In an exhausting-filling cycle, initially all the valves are closed. The vacuum valve 19a is opened first allowing the vacuum line 19 to be applied to the chamber and therethrough to the lamp tube 1. After near vacuum conditions exist within the lamp tube, as monitored by pressure gage 22, the vacuum valve 19a is closed. Then the combustible reducing gas and the oxidizing gas are added through valves 21a and 20a, respectively. Preferably, the combustible gas is added before the oxidizing gas to minimize necessary back pressures in the combustible gas line 21. Proportions of the two types of gases and their pressures in the finished lamp can be controlled by varying the pressure differentials between the gas supplies and the chamber 18 and the time of flowing each gas into the chamber 18, as well as by controlling the extent of gas condensation in the bulb 11 before sealing.

After the exhausting and gas filling of the lamp tube 1, it is ready for the next operation in which gases are partially condensed and the attenuation at the open end of the bulb 11 is tipped or heat sealed. This operation, in accordance with the invention, comprises two distinct steps described in a preferred embodiment as follows:

(1) The sealed end 2 and a portion of the bulb 11 of lamp tube 1 are immersed in a refrigerant which has a boiling point below that of one of the gases of the gaseous mixture within the lamp tube 1. Suitable refrigerants for various gas filling mixtures include liquid nitrogen, liquid ethylene, Freon 11, Freon 14, Freon 21, or Freon 22 (Trademarks of E. I. du Pont de Nemours & Co.) and others. The selection of the refrigerant is usually dependent on the boiling point of the combustible gas; however, if the oxidizer is to be condensed, the selection of the refrigerant would be dependent on the boiling points of the oxidizer. The boiling points of various refrigerants are shown in Table I. The boiling point of liquid oxygen is $-183°$ C.

TABLE I

| Refrigerant: | Boiling point, ° C. |
|---|---|
| Liquid nitrogen | $-195.8$ |
| Liquid ethylene | $-104$ |
| Freon 11 | 23.7 |
| Freon 14 | $-127.9$ |
| Freon 21 | 8.9 |
| Freon 22 | $-40$ |

Table II gives the boiling points various combustible reducing gases and their ratio limits of inflammability withn which they will support combustion. Some are given for mixtures with air, some with oxygen. These are measured at room temperature and at one atmosphere pressure and are given in percent by volume.

TABLE II

| Gas | Boiling Point, ° C. | Limits of Inflammability | |
|---|---|---|---|
| | | Lower | Upper |
| Hydrogen, $H_2$ | $-252.8$ | 4.65 | [1] 93.9 |
| Propane, $C_3H_8$ | $-44.5$ | 5.00 | [2] 15.00 |
| Acetylene, $C_2H_2$ | $-83.6$ | 2.50 | [2] 80.00 |
| Methane, $CH_4$ | $-161.5$ | 5.40 | [1] 59.2 |

[1] Oxygen.
[2] Air.

As shown in FIG. 3, the bulb 11 is cooled to a temperature at which part of the gaseous contents is condensed to form a condensed portion 25. If the combustible gas has a higher boiling point than the oxidizing gas, the condensed portion 25 will be comprised mostly of condensed combustible gas. If this is the case, the time necessary for sufficient condensation will be dependent on condensing a sufficient quantity of combustible gas so that the remaining gaseous phase will not support combustion at the temperature at which the bulb is to be sealed. For example, if the combustible gas is acetylene ($C_2H_2$) and the oxidizing gas is oxygen ($O_2$), the condensed acetylene will comprise the major part of the condensed portion 25 when cooled by a refrigerant of liquid nitrogen (see Table I and Table II).

On the other hand, if the oxidizing gas has a higher boiling point than the combustible gas, the time necessary for sufficient condensation will be dependent on condensing a sufficient quantity of the oxidizer so that the remaining gaseous phase will not be ignited at the temperatures at which the bulb is sealed. For example, if the combustible gas is hydrogen ($H_2$) and the oxidizing gas is oxygen ($O_2$), condensed oxygen will comprise the major or entire portion of the condensed portion 25 when using a refrigerant of liquid nitrogen (see Table I and Table II).

(2) As shown in FIG. 3, after a sufficient quantity of gas has condensed, the attenuated portion 10 near the dome 11a is heated by sharp flames 26 from burners 27 to a sufficiently viscous state to collapse the attenuated portion 10 and form a hermetic seal or tip 28. Tip 28 hermetically seals the gas in the bulb 11. During this tipping operation, the bulb 11 is held by supports 29 to provide the support necessary when the tipping is complete and the finished lamp is formed.

To provide specific examples of the present invention, several lamps of approximately 1.1 cc. in volume were filled successfully with one of each of the following gases: natural gas, hydrogen, propane, acetylene and methane gas and with the necessary oxidizer, oxygen, in the desired proportion. In addition, shredded zirconium foil was added. The following is exemplary of the procedure used:

The lamp tube 1 was first prepared and assembled as described above and illustrated in FIG. 1. In addition, the bulb was filled with combustible filamentary material, preferably shredded zirconium foil having a cross-section of approximately 0.8 mil by 0.8 mil and approximately 23 mg. by weight. The lamp tube 1 was inserted into the exhaust head 16, as shown in FIG. 2. The lamp tube was evacuated, and then a combustible gas, methane for example, was admitted until pressures of 50 mm. Hg to 200 mm. Hg, preferably about 200 mm. was read on the pressure gage 22. Next oxygen was admitted until the pressure gage reading of approximately 1300 mm. Hg. Thus, the resulting gas pressure in the flash lamp tube was approximately 1300 mm. Hg. The lamp contained from 3.85% to 15.4% methane, balance oxygen. Because the lamp tubes were thus filled to a pressure above atmospheric pressure, they had to be reduced to pressures equal to or below atmospheric pressure before they could be tipped by simple operations without requiring complex pressure tipping processes. This pressure reduction can be accomplished by immersing the bulb end of the lamp tube in a suitable refrigerant such as liquid nitrogen for a sufficient time.

The methane-oxygen filled bulbs were left in the liquid nitrogen for approximately 20 to 30 seconds to be certain that a sufficient quantity of the methane gas had been condensed to insure that the methane to oxygen gas ratio was such that the gaseous phase would not be ignited at the temperature used for sealing. When other combustible gases were used in this process, the required cooling times varied; however, 20 to 30 seconds seemed to be long enough to assure that the lamps would not explode and that their gases would not ignite.

Finally, heat was applied by sharp flames 26 from burners 27 which heated the tube to a temperature in the range of about 600 to 700° C., causing the glass to soften sufficiently that the attenuation collapses and fuses, sealing the bulb.

The foregoing is a description of illustrative embodiments of the invention, and it is applicants' intention in the appended claims to cover all forms which fall within the scope of the invention.

What we claim as new and desire to secure by Letters Patent of the United States is:

1. The method of making a flash lamp having a radiation-transmitting vitreous bulb filled with a combustible gas mixture and heat sealed at a tip comprising the steps of:

(A) exhausting said bulb through an opening in said bulb, (B) filling said bulb with combustible components through said opening, said combustible components comprising a gaseous portion, said gaseous portion comprising a combustible reducing gas and an oxidizing gas, (C) cooling said bulb to a temperature below the boiling point of at least one of said combustible reducing gas and said oxidizing gas, for a time sufficient to condense enough of one of said combustible reducing gas and said oxidizing gas so that the remaining gaseous phase will not support combustion at the temperature required to seal said tip, and (D) sealing said opening in said bulb by means including heating said envelope about said opening to a sufficiently viscous state to form said tip.

2. The method of claim 1 in which so much of said combustible reducing gas is condensed that said remaining gaseous phase will not support combustion at the temperature required to seal said tip.

3. The method of claim 1 in which so much of said oxidizing gas is condensed that said remaining gaseous phase will not support combustion at the temperature required to seal said tip.

4. The method of claim 1 in which said combustible reducing gas is at least one gas selected from the group consisting of hydrogen, propane, acetylene and methane.

5. The method of claim 1 in which the cooling of said envelope in step C is cooled by at least partial immersion in liquid nitrogen.

6. The method of claim 1 of making a flash lamp of the kind having a radiation-transmitting vitreous bulb with one end closed by an exhaust tip wherein the bulb formed by heating a portion of lamp tube and drawing said tube out to form an attenuation through which the gaseous phase of the combustible components is introduced into said bulb and said attenuation is closed by heating to form a tip; the other end of said bulb being sealed by means including a lamp mount structure having ignition means inside the lamp and allowing for electrical contact outside said bulb, said method comprising the steps of:

(A) exhausting said bulb through said attenuation, (B) filling said bulb with combustible components comprising a filamentary combustible material and a gaseous phase, said gaseous phase comprising a combustible reducing gas and an oxidizing gas, (C) cooling said bulb on its outer surfaces with a refrigerant at a temperature below the boiling point of said gaseous phase for a time sufficient to condense enough of said combustible reducing gas so that the remaining gaseous phase will not support combustion at the temperature required to seal said tip, and (D) sealing said bulb by means including heating said attenuation to a sufficiently viscous state to form said tip.

References Cited

UNITED STATES PATENTS 3,162,499  12/1964  Gustin _____ 316—24

RICHARD H. EANES, JR., *Primary Examiner.*